July 14, 1931.  C. W. TODD  1,814,099
RAILROAD VEHICLE
Filed Dec. 13, 1929  2 Sheets-Sheet 1
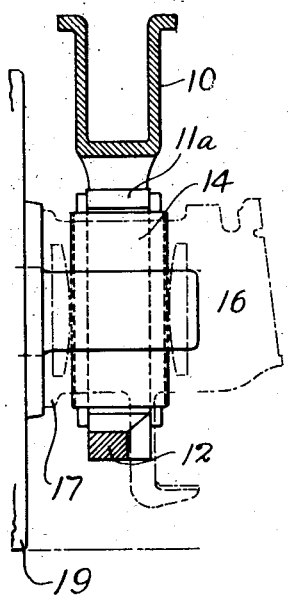
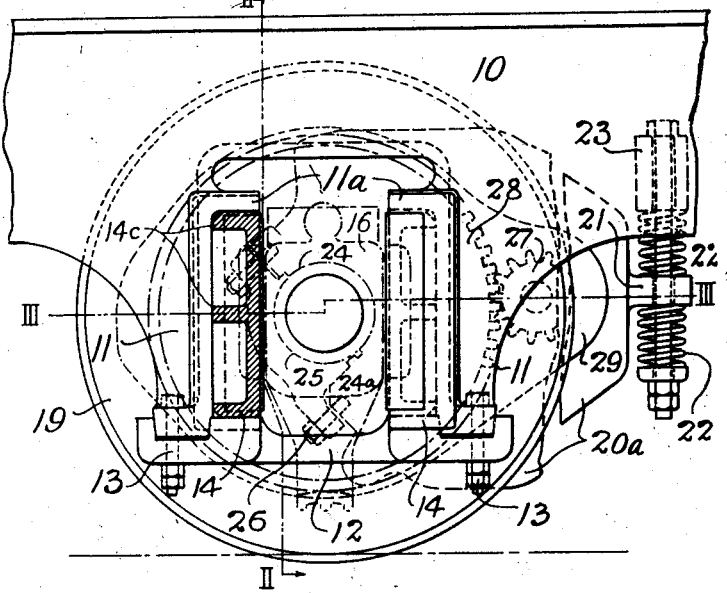
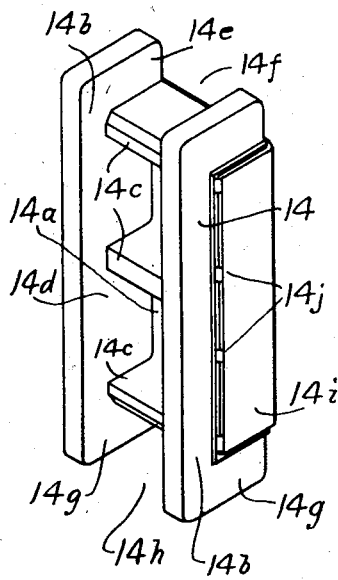
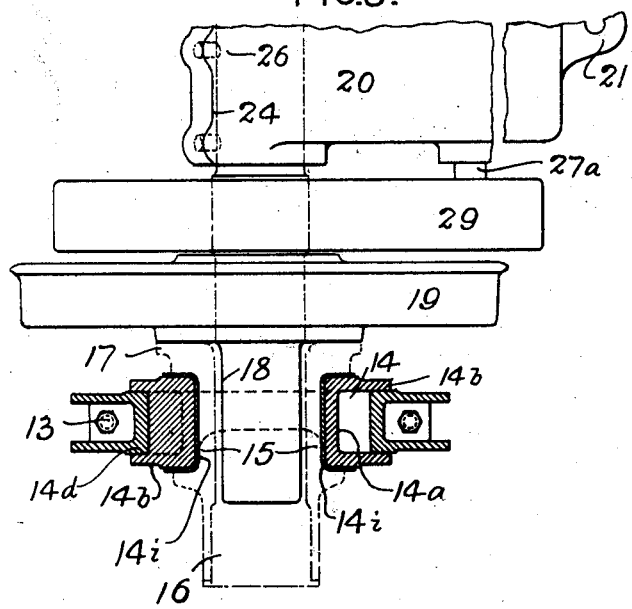
INVENTOR
Charles W. Todd.
BY S. C. Yeaton
ATTORNEY

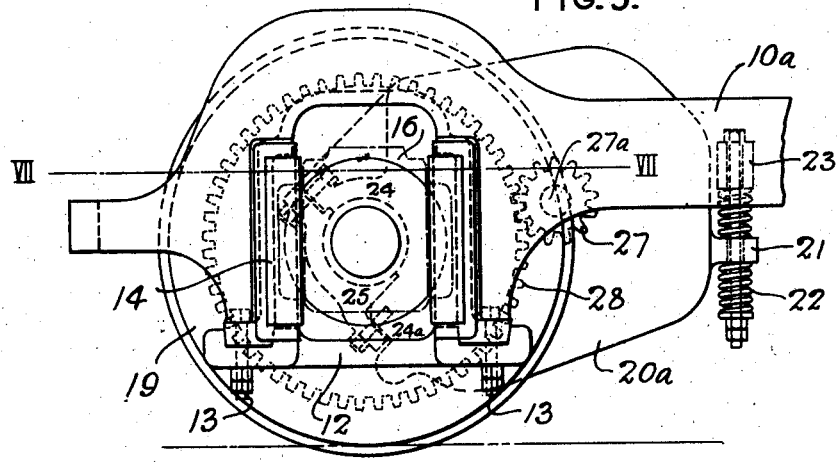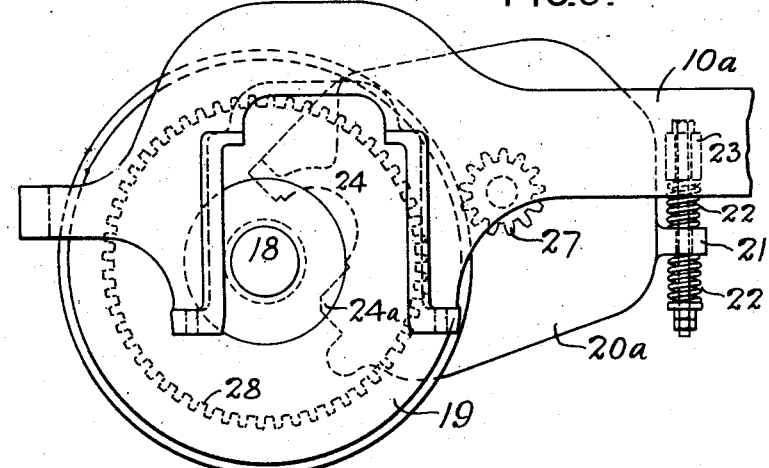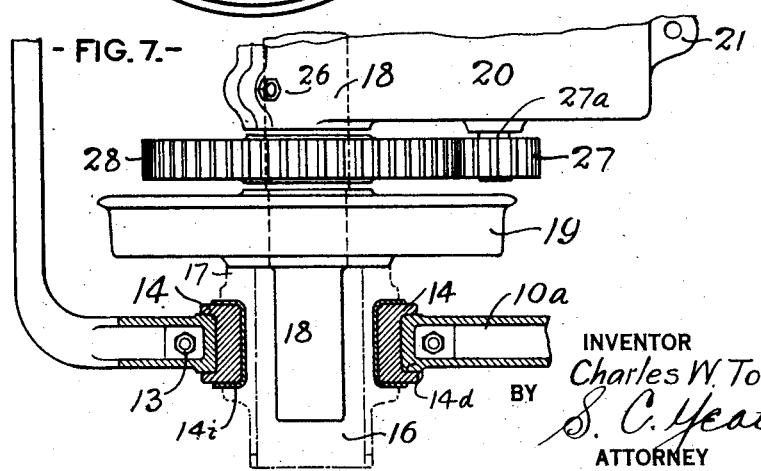

Patented July 14, 1931

1,814,099

UNITED STATES PATENT OFFICE

CHARLES W. TODD, OF SCHENECTADY, NEW YORK

RAILROAD VEHICLE

Application filed December 13, 1929. Serial No. 413,701.

This invention relates to railroad vehicles, and more particularly to such vehicles wherein the drive is effected by an electric motor supported both by the frame and the driving axle, and geared to the driving axle.

Heretofore, in vehicles of the type indicated, it has been the practice to yieldingly support one side of the driving motor on the frame, and the other side of the motor on the axle. To provide for the support on the axle, the motor casing is made with a split bearing comprising two halves, one of which is an integral part of the motor casing and extends a substantial distance around the axle below the horizontal diameter thereof to afford adequate strength to resist thrusts, and the other of which halves is in the form of a cap, detachable to effect removal of the motor. To enable the driving axle to be dropped from the frame so that repairs to the driving wheels may be made, it has been necessary to detach the motor and its electrical connections, as the width of the gap between the pedestals of the frame was not sufficiently great to permit the axle to be moved clear of the bottom portion of the integral half by the bearing.

An object of the present invention is to provide a simple, durable, and inexpensive construction enabling the driving axle to be dropped without disconnecting the motor from the frame or detaching its electrical connections.

Other objects of the invention will hereinafter readily appear.

Briefly stated the invention contemplates a construction enabling the driving axle to be moved so as to clear the integral half of the motor bearing and unmesh the driving gears, by merely dropping the pedestal shoes and moving the driving box longitudinally along the axle clear of the pedestals.

The improvement claimed is hereinafter fully set forth.

In the accompanying drawings: Figure 1 is a side view in elevation of a portion of an electric locomotive embodying the invention, one of the pedestal shoes being shown in vertical section; Fig. 2, a transverse vertical section, taken on the line II—II of Fig. 1; Fig. 3, a transverse horizontal section of the pedestals and shoes taken on the line III—III of Fig. 1; Fig. 4, an isometric view of one of the pedestal shoes; Fig. 5, a side view in elevation of a portion of a truck embodying the invention; Fig. 6, a view similar to Fig. 5, the gear casing, bearing cap, and driving box being removed, and the driving axle moved clear of the integral half of the bearing with its gear wheel out of mesh with the pinion on the motor to permit dropping the axle without detaching the motor from the frame or disconnecting its electrical connections; and, Fig. 7, a transverse longitudinal section through the pedestals and shoes of a modified form of construction wherein thinner pedestal shoes and a wider journal box adapted for roller bearings, are employed.

In the practice of the invention, referring descriptively to the specific embodiments thereof which are herein exemplified, the side frame members 10, are each formed with a pair of pedestal jaws 11, which are braced at their bottoms by a tie bar 12 detachably secured to the pedestal jaws by bolts 13. Each jaw is provided with a pedestal shoe 14, which slidingly fits in a groove 15 formed in the side face of a driving box 16 having a hub bearing plate 17. A driving axle 18 mounted on wheels 19 is journalled in the journal or driving boxes 16. For driving the axle an electric motor 20 having a casing 20a is provided. One side of the motor casing is yieldingly supported on the frame by a lug 21 formed on the casing and interposed between springs 22 supported by a frame cross-tie member 23. The other side of the casing is supported on the axle 18 by a bearing surrounding the axle and split longitudinally on a diagonal diameter of the bearing bore into two half sections, respectively designated for convenience of description as the inner and the outer section. The inner section 24 may be formed integrally with the motor casing 20a and has a portion 24a which extends around the axle a substantial distance below the horizontal diameter thereof, the outer section 25 is in the nature of a cap, and is detachably secured to the inner section 24 by bolts 26 passing through flanges on the sections.

The gearing for driving the axle by the motor, comprises a pinion 27 mounted on the shaft 27a of the motor and meshing with a gear wheel 28 mounted on the axle. A detachable housing 29 serves to protect the gears.

To provide for dropping the wheels and axle, without the necessity of disconnecting the motor from the frame or disconnecting its electrical connections, the gap between the shoe faces of the pedestal jaws is made of sufficient width to permit the axle to be moved back from the inner section 24 of the split bearing to a position where it can be dropped vertically without interference with the portion 24a thereof, and the pedestal shoes and the driving box are made of a combined width to fill the gap. Where a narrow driving box of the crown bearing type shown in Fig. 1 is used, the pedestal shoes, are made relatively thick, and where a wide driving box of the roller bearing type shown in Fig. 7 is used, the pedestal shoes are made relatively thin.

It is to be noted that the driving boxes 16 are disposed outside of the wheels, that their hub bearing plates 17 are of less diameter than the width of the gap between the pedestal jaws, and that the pedestal shoes 14 are proportioned to position the hub bearing plates relatively to the pedestal jaws so that when the pedestal shoes are dropped the driving boxes may be slid outwardly along the axle clear of the pedestal jaws without moving the axle, thus leaving an unobstructed space between the axle and the rear pedestal jaws, sufficient to permit the axle to be moved away from the inner section 24 of the split bearing clear of the portion 24a thereof.

Each pedestal shoe 14 comprises a body formed as an integral casting and having a front vertical wall 14a; two spaced parallel side walls or flanges 14b each joined at a right angle to the side margin of the front wall to provide a groove 14d for the reception of a pedestal jaw; and spaced horizontal lugs or ribs 14c joined to the front wall and to the side walls, and terminating short of the rear edges of the side walls for spacing the front wall a substantial distance away from the shoe face of a pedestal. The side walls project above the front wall to provide portions 14e forming a jaw or groove 14f for the reception of a projection or shoulder 11a on the pedestal jaw; and project below the front wall to provide portions 14g forming a jaw or groove 14h in which the pedestal tie bar 12 fits. This construction enables the pedestal shoes to efficiently withstand the lateral thrusts of great magnitude, encountered in service. A renewable wear lining 14i of thin plate metal is provided on the front and side faces of each pedestal shoe, and may be secured in place by any suitable means, such as the welding 14j.

When it is desired to remove the axle and wheels to effect renewals or repairs, the motor casing 20a is supported in any suitable manner, without disconnecting it from the frame or disturbing its electrical connections, the outer section 25 of the split bearing is removed, the gear housing 29 is removed, the split bearing end of the motor is suitably jacked up or supported, the pedestal tie bars 12 are detached, the pedestal shoes 14 are dropped, the driving boxes 16 are slid longitudinally along the axle out of the pedestal jaws, the wheels 19 are moved backing the axle 18 away from the inner section 24 of the split bearing to a position clear of the portion 24a thereof with the teeth of the gears 27 and 28 out of mesh, and the wheels and axle are either dropped into a pit or the frame is lifted clear of the wheels.

The construction shown in Figs. 5 and 6 is substantially the same as that shown in Fig. 1, except that it illustrates the application of the invention to a truck. In these views the truck frame is designated 10a.

In the modified form of construction shown in Fig. 7, a wider driving box than shown in Fig. 1 is used, which box may be provided with roller bearings (not shown), and the pedestal shoes are made relatively thin compared to those shown in Fig. 1, the ribs 14c being omitted. While the pedestal shoes described are of the straight type, it is to be understood that the shoe and the pedestal jaw may be suitably tapered to take up for wear, or that an independent wedge may be used between the shoe and the jaw.

An important advantage of the described construction is that it enables, first, the pedestal shoes and the driving boxes to be moved clear of the pedestal jaws without backing the axle away from the inner section 24 of the bearing, and, then, the axle to be backed away from the inner section by a single operation to a position clear of the portion 24a of the inner section, where the driving gears are out of mesh and the frame and axle can be vertically separated, all without detaching the motor from the frame or disturbing its electrical connections.

A further important advantage of the described construction is the small number of parts used, no spacers being required between the pedestal shoes and the pedestals.

A further important advantage of the improved construction is the increased strength of the pedestal shoes to withstand lateral thrusts, obtained by omitting spacers and bracing the pedestal shoes at their tops against the pedestal jaws and at their bottoms against the pedestal tie bars.

While one of the preferred forms of construction has been described and shown, it is obvious that many variations in procedure, form, arrangement, and construction of parts, may be resorted to, and the invention, therefore, is not limited to the particular embodiment disclosed, but includes such changes and modifications as come within the spirit and scope of the invention as set forth in the appended claims.

The invention claimed and desired to be secured by Letters Patent, is:—

1. In a railroad vehicle, the combination of an axle; a pair of wheels supporting the axle; a journal box on one end of the axle outside of the wheels; a side frame member disposed outside of the wheels and having a pair of pedestal jaws straddling the journal box; a motor disposed at one side of the axle; split bearing means connected to the motor, surrounding the axle, and supporting at least a portion of the weight of the motor thereon, the remaining portion being supported on the vehicle frame structure; driving means connecting the motor and the axle, at least one of said two means being disposed to obstruct purely vertical initial displacing movement of the axle from its normal position, a detachable pedestal shoe between each of the pedestal jaws and the journal box, the journal box, the pedestal shoes, and the gap between the pedestal jaws, being relatively proportioned to permit, without backing the axle away from the bearing means, the journal box to be slid longitudinally of the axle clear of the pedestal jaws, when the pedestal shoes are detached, and to permit the axle to be removed from the side frame member without dismounting the motor from the vehicle frame structure by moving the axle initially toward one of the pedestal jaws to avoid the obstruction, and then passing the same downwardly through the pedestal jaws, when the bearing has been separated and the pedestal shoes and journal box have been removed.

2. In a railroad vehicle, the combination of an axle; a pair of wheels supporting the axle; a journal box on one end of the axle outside of the wheels; a hub bearing on the journal box; a side frame member disposed outside of the wheels and having a pair of pedestal jaws straddling the journal box; a motor disposed at one side of the axle; split bearing means connected to the motor, surrounding the axle, and supporting at least a portion of the weight of the motor thereon, the remaining portion being supported on the vehicle frame structure; driving means connecting the motor and the axle, at least one of said two means being disposed to obstruct purely vertical initial displacing movement of the axle from its normal position; a detachable pedestal shoe between each of the pedestal jaws and the journal box, the journal box, the hub bearing, the pedestal shoes, and the gap between the pedestal jaws, being relatively proportioned to permit, without backing the axle away from the bearing means, the journal box and the hub bearing to be slid longitudinally of the axle clear of the pedestal jaws, when the pedestal shoes are detached, and to permit the axle to be removed from the side frame member without dismounting the motor from the vehicle frame structure by moving the axle initially toward one of the pedestal jaws to avoid the obstruction, and then passing the same downwardly through the pedestal jaws, when the bearing has been separated and the pedestal shoes and journal box have been removed.

3. In a railroad vehicle, the combination of an axle; a pair of wheels supporting the axle; a journal box on one end of the axle outside of the wheels; a side frame member disposed outside of the wheels and having a pair of pedestal jaws straddling the journal box; a motor disposed at one side of the axle; a split bearing connected to the motor, surrounding the axle, and supporting at least a portion of the weight of the motor thereon, the remaining portion being supported on the vehicle frame structure, the said bearing comprising an inner section extending below the horizontal diameter of the axle, thereby preventing purely vertical initial displacing movement of the axle from its normal position, and an outer detachable section; a driving connection between the motor and the axle; a detachable pedestal shoe between each of the pedestal jaws and the journal box, the journal box, the pedestal shoes, and the gap between the pedestal jaws, being relatively proportioned to permit, without backing the axle away from the bearing, the journal box to be slid longitudinally of the axle clear of the pedestal jaws, when the pedestal shoes are detached, and to permit the axle to be removed from the side frame member without dismounting the motor from the vehicle frame structure by moving the axle initially toward one of the pedestal jaws to avoid the obstruction, and then passing the same downwardly through the pedestal jaws, when the bearing has been separated and the pedestal shoes and journal box have been removed.

4. In a railroad vehicle, the combination of an axle; a pair of wheels supporting the axle; a journal box on one end of the axle outside of the wheels; a side frame member disposed outside of the wheels and having a pair of pedestal jaws straddling the journal box; a motor disposed at one side of the axle; a split bearing connected to the motor, surrounding the axle, and supporting at least a portion of the weight of the motor thereon, the remaining portion being supported on the vehicle frame structure, the said bearing comprising an inner section extending below the horizontal diameter of the axle, thereby preventing purely vertical initial displacing movement of the axle from its normal position, and an outer detachable section; a driving connection between the motor and the axle; a detachable pedestal shoe between each of the pedestal jaws and the journal box, the journal box, the pedestal shoes, and the gap between the pedestal jaws, being relatively proportioned to permit, without backing the axle away from the bearing, the journal box to be slid longitudinally of the axle clear of the pedestal jaws, when the pedestal shoes are detached, the space between the axle and the pedestal jaw on the opposite side of the axle from the motor, being sufficiently great to permit the axle to be backed away from the inner section of the split bearing to a position clear thereof where the side frame and axle can be vertically separated, when the outer section of the bearing and the pedestal shoes have been detached, and the journal box has been moved longitudinally of the axle clear of the pedestals.

5. In a railroad vehicle, the combination of an axle; a pair of wheels supporting the axle; a journal box on one end of the axle outside of the wheels; a hub bearing on the journal box; a side frame member disposed outside of the wheels and having a pair of pedestal jaws straddling the journal box; a motor disposed at one side of the axle; a split bearing connected to the motor, surrounding the axle, and supporting at least a portion of the weight of the motor thereon, the remaining portion being supported on the vehicle frame structure, the said bearing comprising an inner section extending below the horizontal diameter, of the axle, thereby preventing purely vertical initial displacing movement of the axle from its normal position, and an outer detachable section; a driving connecting between the motor and the axle; a detachable pedestal shoe between each of the pedestal jaws and the journal box, the journal box, the hub bearing, the pedestal shoes, and the gap between the pedestal jaws, being relatively proportioned to permit, without backing the axle away from the bearing, the journal box and the hub bearing to be slid longitudinally of the axle clear of the pedestal jaws, when the pedestal shoes are detached, and to permit the axle to be removed from the side frame member without dismounting the motor from the vehicle frame structure by moving the axle initially toward one of the pedestal jaws to avoid the obstruction, and then passing the same downwardly through the pedestal jaws, when the bearing has been separated and the pedestal shoes and journal box have been removed.

6. In a railroad vehicle, the combination of an axle; a pair of wheels supporting the axle; a journal box on one end of the axle outside of the wheels; a hub bearing on the journal box; a side frame member disposed outside of the wheels and having a pair of pedestal jaws straddling the journal box; a motor disposed at one side of the axle; a split bearing connected to the motor, surrounding the axle, and supporting at least a portion of the weight of the motor thereon, the remaining portion being supported on the vehicle frame structure, the said bearing comprising an inner section extending below the horizontal diameter of the axle, thereby preventing purely vertical initial displacing movement of the axle from its normal position, and an outer detachable section; a driving connection between the motor and the axle; a detachable pedestal shoe between each of the pedestal jaws and the journal box, the journal box, the hub bearing, the pedestal shoes, and the gap between the pedestal jaws, being relatively proportioned to permit, without backing the axle away from the bearing, the journal box and the hub bearing to be slid longitudinally of the axle clear of the pedestal jaws, when the pedestal shoes are detached, the space between the axle and the pedestal jaw on the opposite side of the axle from the motor, being sufficiently great to permit the axle to be backed away from the inner section of the split bearing to a position clear thereof where the side frame and axle can be vertically separated, when the outer section of the bearing and the pedestal shoes have been detached, and the journal box has been moved longitudinally of the axle clear of the pedestals.

7. In a railroad vehicle, the combination of a side frame member; a wheel-carrying axle extending in an opening in the member open at the bottom permitting the axle to be passed therethrough; a motor disposed to one side of the axle for driving the same; means connecting the axle with the motor disposed to offer obstruction to purely vertical initial movement of the axle from assembled position; and means between the axle and the wall of the opening remote from said motor including an axle bearing, adapted to be moved clear of said frame member the movement of said bearing being longitudinally of the axle, to provide thereby an unobstructed space between the axle and the wall to permit the axle to be moved into said space in its initial movement when disassembling same.

8. In a railroad vehicle, the combination of a side frame member; a wheel-carrying axle extending in an opening in the member open at the bottom permitting the axle to be passed therethrough; a motor disposed to one side of the axle for driving the same; means connecting the axle with the motor disposed to offer obstruction to purely vertical initial movement of the axle from assembled position; and means between the axle and the wall of the opening remote from said motor including an axle bearing and an element between the bearing and the wall, adapted to be moved clear of said frame member by dropping the element and moving the bearing longitudinally of the axle, to provide thereby an unobstructed space between the axle and the wall to permit the axle to be moved into said space in its initial movement when disassembling same.

9. In a railroad vehicle, the combination of a side frame member having an opening adapted to receive an axle and to permit the side frame member to be lifted vertically clear of the axle; a wheel-carrying axle extending into the opening; a motor disposed to one side of the axle for driving same; means connecting the axle with the motor disposed to offer obstruction to purely vertical initial movement of the axle from assembled position; and filler means between the axle and a wall of the opening remote from said motor adapted when removed to provide an unobstructed space between the axle and said remote wall, into which the axle may be moved initially in disassembling the same from the motor and the side frame member, the said filler means including an axle bearing adapted to be moved longitudinally of the axle clear of said side frame member while the axle is in its initial position.

CHARLES W. TODD.